United States Patent
Ishikawa et al.

(10) Patent No.: US 6,907,250 B2
(45) Date of Patent: Jun. 14, 2005

(54) WIRELESS CHANNEL CHANGEOVER METHOD AND MOBILE COMMUNICATION SYSTEM

(75) Inventors: Yoshihiro Ishikawa, Yokosuka (JP); Seizo Onoe, Yokohama (JP); Kazunori Obata, Yokosuka (JP); Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 520 days.

(21) Appl. No.: 10/017,597

(22) Filed: Dec. 18, 2001

(65) Prior Publication Data

US 2002/0077110 A1 Jun. 20, 2002

(30) Foreign Application Priority Data

Dec. 19, 2000 (JP) .......................................... 2000-386043
Dec. 14, 2001 (JP) .......................................... 2001-381949

(51) Int. Cl.[7] ................................................ H04Q 7/20
(52) U.S. Cl. ................. 455/450; 455/452.1; 455/452.2; 455/453; 455/454; 455/455; 455/451; 455/456.3; 455/456.2; 455/464; 455/439; 455/442; 455/444; 455/448
(58) Field of Search ............................. 455/450, 452.1, 455/452.2, 453, 454, 455, 456.1, 456.2, 464, 439, 442, 444, 448, 451

(56) References Cited

FOREIGN PATENT DOCUMENTS

| EP | 0 977 377 | 2/2000 |
|----|-----------|--------|
| EP | 0 981 229 | 2/2000 |
| EP | 1 043 902 | 10/2000 |
| WO | WO 99/63713 | 12/1999 |
| WO | WO 99/66748 | 12/1999 |
| WO | WO 00/51245 | 8/2000 |
| WO | WO 01/43485 | 6/2001 |

*Primary Examiner*—David Hudspeth
*Assistant Examiner*—David Q Nguyen
(74) *Attorney, Agent, or Firm*—Oblon, Spivak, McClelland, Maier & Neustadt, P.C.

(57) ABSTRACT

A mobile communication system includes a plurality of base stations and a mobile station communicating with the base station through a wireless channel. The system comprises a part which measures an amount of information transferred between the base station and the mobile station and a comparator which compares the measured amount of information with first and second threshold values corresponding to a currently used wireless channel. A wireless channel changeover part changes the current wireless channel to a wireless channel with a transmission capability higher or lower than that of the current wireless channel when the measured amount of information is above the first threshold value or below the second threshold value, respectively.

22 Claims, 5 Drawing Sheets

| TRANSMISSION CAPABILITY OF A CURRENT WIRELESS CHANNEL | FIRST THRESHOLD VALUE | SECOND THRESHOLD VALUE |
|---|---|---|
| $R_1$ | THR1-1 | THR2-1 |
| $R_2$ | THR1-2 | THR2-2 |
| ... | ... | ... |
| $R_N$ | THR1-N | THR2-N |

FIG.4

WIRELESS CHANNEL CHANGEOVER METHOD AND MOBILE COMMUNICATION SYSTEM

BACKGROUND OF THE INVENTION

1. Field of the Invention

The present invention generally relates to a method for changing a wireless channel established between a base station and a mobile station to another wireless channel. The present invention also relates to a mobile communication system carrying out the method.

2. Description of the Related Art

The mobile communication system, such as a cellular phone system, which has recently become commonly spread, provides a service by partitioning an overall service area into significantly small wireless zones referred to as "cells". The mobile communication system includes a plurality of base stations, each of which covers each partitioned wireless zone and a mobile station, which communicates with the base station. The base station and the mobile station communicate with each other by means of a wireless channel established between the base and mobile stations.

In general, the wireless channel between the base and mobile stations are differently established according to a communication style between them. In a PDC (Personal Digital Cellular) system, for example, which is widely spread in Japan, for a narrowband audio communication technique known as "a half rate", one of time slots is used as the wireless channel where the one time slot is derived from a wireless carrier by time dividing the one wireless carrier into 6 components. The wireless carrier is one of radio frequency resources. For a high quality audio communication known as "a full rate", two of the time slots derived by time dividing the one wireless carrier are used as the wireless channel.

In a packet communication system, since one wireless carrier is shared among a plurality of user's mobile stations, an amount of data transmitted from each mobile station is reduced in order to coexist with other mobile stations when the mobile stations transmitting the data compete with each other. On the contrary, the wireless channel is configured so that one mobile station can occupy the wireless carrier when no other mobile stations transmit the data.

In a W-CDMA (Wideband Code Division Multiple Access) system, which has been researched and developed as one of possible third generation mobile communication systems, the wireless channel comprises the wireless carriers and spreading codes. Various types of the wireless channels are provided in accordance with information type, such as audio or data, to be transmitted. For data transmission, the wireless channel to be used changes as a transmission rate varies. Different wireless channels can coexist altogether by employing a different spreading coding each other.

A specification, TS 25.213 "Spreading and Modulation (FDD)", formulated by 3GPP (Third Generation Partnership Project), which is a standardization organization, specifies an assignment of the spreading codes in the third generation mobile communication system. The W-CDMA system also uses different wireless channels or spreading codes in accordance with the communication style between the base and mobile stations.

Thus, in the mobile communication system, since the available radio frequency resources are limited, the use of the appropriate wireless channel in conformity with the communication style is significantly important in order to achieve a higher quality of communication.

For the packet communication system, the amount of outgoing data continuously varies. As a result, the data is continuously delivered when transmitting a large amount of data and the least possible amount of data required for holding a connection is intermittently delivered when there are no data to be transferred. In an ISDN (Integrated Services Digital Network) system for a fixed communication system, a BOD (Bandwidth On Demand) technique is employed to achieve efficient link availability.

The BOD basically uses one B channel having a transmission capacity of 64 kbps in case of an ordinary condition. The BOD technique controls the use of the B channels depending on the amount of data to be transferred. For example, it reserves a bundle of a plurality of B channels in order to achieve higher transmission capacity when the amount of data to be transferred increases. Then, as the amount of data to be transferred decreases, the BOD sequentially relieves the B channel from the reserved bundle of the B channels and eventually the number of the B channels used by the BOD returns to one.

In general, such control of the use of the B channels is carried out when two terminals communicate or the terminal and a switching facility communicate with each other. If the bundle of the B channels were regularly used, the communication through the bundle of the B channels would cost much higher because connection fees are charged on the basis of one channel. However, in the BOD technique, the communication cost will be reduced because the number of the B channels being used varies as a function of the data to be transferred. Furthermore, the efficient use of the connections is achieved in the BOD environment. It can be appreciated that the BOD technique is a suitable control scheme for the packet communication where a data transfer frequency continuously changes.

However, an application of the above BOD technique to the base and mobile stations in the mobile communication system comes across several problems. Firstly, since a variety of information for keeping on the wireless channel must be carried on the wireless channel, the transmission capacity of the wireless channel reduces. For example, the information includes pilot signals used for correctly receiving signals subject to a phase rotation and/or an amplitude variation due to a fading along a transmission path, commands for transmission power control, and so on. Such information is essential in the mobile communication system, which is involved in significantly variable transmission conditions, whereas the information adversely effects on the transmission efficiency.

Under the mobile communication environment, if the mobile station uses the bundle of the plurality of the wireless channels, each wireless channel of the bundle transmits the same information and resulting in reduction of the transmission efficiency. This causes not only a problem that the mobile station cannot achieve the desired transmission efficiency, but also a further problem that the total transmission efficiency over the system is reduced because the number of the wireless channels available to the other mobile stations decreases.

Secondarily, even if the wireless channel or the spreading code is available to the mobile station, the use of such wireless channel can increase the radio interference with the other mobile stations and thus degrading the total transmission capacity over the system. This is because, for example, in the PDC system, the mobile station trying to use that wireless channel may be interfered with the same wireless channel that has been repeatedly used by the other mobile station/stations.

For W-CDMA system, Japanese Laid-Open Patent Application No.8-191481 discloses a method for determining an acceptance of a new call based on a prediction of interference quantity at the base station. The document describes the importance of the interference quantity on an uplink of the system in detail. International Patent Publication WO98/30057, titled "CALL ACCEPTANCE CONTROL METHO FOR CDMA MOBILE RADIO COMMUNICATION SYSTEM AND MOBILE STATION DEVICE", describes a method for determining whether the call is accepted or not in the mobile station by reporting information concerning the uplink interference quantity and a downlink transmission power from the base station to the mobile station. Furthermore the latter document describes that the total transmission power is significantly critical with respect to quality on the downlink in detail. In the W-CDMA system, the uplink interference and/or downlink transmission power will often limits the transmission capability of the system.

Therefore, for the mobile communication system, a technique is demanded to improve transmission efficiency without applying the above BOD-like technique.

SUMMARY OF THE INVENTION

Accordingly, it is an object of the present invention to provide a method for changing wireless channels that can improve transmission efficiency when data transmission is large in quantity.

The above object of the present invention is achieved by a method for changing wireless channels used in a communication between a base station and a mobile station, comprising the steps of:

measuring information amount (amount of information) transferred between the base station and the mobile station;

comparing the measured information amount with first and second threshold values corresponding to a transmission capability for a current wireless channel being used between the base and the mobile stations; and changing the current wireless channel to the wireless channel with a higher transmission capability than the current wireless channel if the measured information amount is above the first threshold value and changing the current wireless channel to the wireless channel with a lower transmission capability than the current wireless channel if the measured information amount is below the second threshold value.

With the method for changing the wireless channels described above, a total transmission efficiency or performance of a mobile communication system including the base stations and the mobile stations can be improved by changing the wireless channel currently used between the base station and the mobile station to the wireless channel suitable for a required transmission capability.

Measuring the information amount transferred between the base and mobile stations may consist of measuring the amount of the information yet to be transmitted or measuring the amount of the information currently being transmitted.

In the above-mentioned method for changing wireless channels used in the communication, the amount of the information yet to be transmitted is measured as the amount of the information to be compared with the first threshold; and the amount of the information currently being transmitted is measured as the information amount to be compared with the second threshold.

Thus, if the amount of the information yet to be transmitted is above the first threshold value, then the current wireless channel will be changed to the wireless channel with the higher transmission capability and if the amount of the information of the data currently being transmitted is below the second threshold value, then the current wireless channel will be changed to the wireless channel with the lower transmission capability. As a result, much improved transmission efficiency can be achieved.

In the above-mentioned method, the amount of the information to be compared with the first and second threshold values may be the amount of the information yet to be transmitted. Furthermore, measuring the amount of the data transmitted during a predetermined time may derive the amount of the information.

In the above-mentioned method, it is preferable that when the current wireless channel is changed to the wireless channel of the higher or lower transmission capability is appropriately determined by taking account of user's ease of operation as well as a load imposed on a service provider. To do this, the current wireless channel may be changed to the wireless channel with the higher transmission capability than the current wireless channel only if the measured information amount is successively for a predetermined count of times above the first threshold value and/or the current wireless channel is changed to the wireless channel with the lower transmission capability than the current wireless channel only if the measured information amount is successively for a further predetermined count of times below the second threshold value.

It has been found that even if the wireless channel is free, use of this free wireless channel between the base station and one mobile station may cause an interference with the communication between the base station and other mobile stations under the heavy interference conditions. The present invention is directed to improving the total transmission efficiency of the mobile communication system without causing the interference with other communications by disabling the assignment of such wireless channels, which may interfere with the other communication. Therefore, the method for changing the wireless channels described above further comprises the steps of:

determining whether the wireless channel intended to be changed over can be assigned to the communication;

if it is determined that this is not the case, after a predetermined time period, determining again whether the intended wireless channel can be assigned to the communication; and if it is determined that this is the case, changing the current wireless channel to the intended wireless channel.

The method for changing the wireless channels described above is also directed to improving the total transmission efficiency of the mobile communication system without causing the interference with other communications. To this end, the method further comprises the steps of:

determining whether the wireless channel intended to be changed can be assigned to the communication;

if it is determined that this is not the case, entering an assignment request indicating changeover to the intended wireless channel into the base station and again determining whether the intended wireless channel can be assigned to the communication in order of the entered assignment request; and if it is determined this is the case, changing the current wireless channel to the intended wireless channel.

The present invention is also directed to prohibiting a degradation of the total transmission efficiency due to changing to the wireless channel having the transmission capability higher than the required one as well as ensuring the required transmission capability to be achieved. To do this, the method for changing the wireless channels further comprises the steps of:

if at least one of an upper limit and a lower limit of the required transmission capability is set, determining whether the transmission capability of the intended wireless channel is either above the upper limit or below the lower limit; and if it is determined that the transmission capability of the intended wireless channel is above the upper limit or below the lower limit, disabling to change the current wireless channel to the intended wireless channel.

The method for changing the wireless channels described above is also directed to ensuring the required transmission capability to be achieved as well as reducing the interference with other communications. To this end, the method further comprises the steps of:

if a lower limit of the required transmission capability is set, determining whether the transmission capability of the intended wireless channel is below the lower limit;

if it is determined that this is the case, establishing the wireless channel shared by some communications between the base station and each of the plurality of the mobile stations, respectively, while reserving the current wireless channel.

It is another object of the present invention to provide a mobile communication system for changing wireless channels that can improve transmission efficiency when data transmission is large in quantity.

According to the present invention a mobile communication system is adapted to carry out the above method for changing the wireless channels. To this end, the mobile communication system including a plurality of base stations and a mobile station communicating with the base station through a wireless channel, comprises:

an information amount measuring part that measures an amount of information, transferred between the base station and the mobile station;

a comparator part which compares the measured amount of information with first and second threshold values predetermined for a current wireless channel being used by the base and mobile stations;

a wireless channel changeover part which changes the current wireless channel to a wireless channel with a transmission capability higher than that of the current wireless channel when the measured amount of information is above the first threshold value and changes the current wireless channel to a wireless channel with a transmission capability lower than that of the current wireless channel when the measured amount of information is below the second threshold value.

In the mobile communication system described above, said information amount measuring part is arranged to measure the amount of information yet to be transmitted.

Also, in the mobile communication system as described above, the information amount measuring part is arranged to measure the amount of information that has been transmitted during a predetermined time period.

Furthermore, the mobile communication system as described above further comprises:

an assignment ability estimating part that determines whether the wireless channel intended to be changed over can be assigned to the communication. And when the assignment ability estimating part determines that this is not the case, the assignment ability estimating part determines again whether the intended wireless channel can be assigned to the communication, after a predetermined time period. The wireless channel changeover part changes the current wireless channel to the intended wireless channel, when the assignment ability estimating part has determined that this is the case.

The mobile communication system as described above further comprises:

an assignment ability estimating part which determines whether the wireless channel intended to be changed over can be assigned to the communication, and an assignment request entering part, which enters an assignment request that indicates changeover to the intended wireless channel, when the assignment ability estimating part determines that the intended wireless channel cannot be assigned. In the system, the assignment ability estimating part determines again whether the intended wireless channel can be assigned to the communication in order of the entered assignment request, when the assignment ability estimating part determines that the intended wireless channel cannot be assigned, and the wireless channel changeover part changes the current wireless channel to the intended wireless channel, when the assignment ability estimating part has determined that this is the case.

Furthermore, the mobile communication system as described above further comprises:

a transmission capability determining part that determines whether a transmission capability of the wireless channel intended to be changed over is either above an upper limit or below a lower limit for a required transmission capability. In the system, the wireless channel changeover part disables for changing the current wireless channel to the intended wireless channel, when it is determined that the transmission capability of the intended wireless channel is above the upper limit or below the lower limit.

Moreover, the mobile communication system as described above further comprises:

a transmission capability determining part that determines whether a transmission capability of the wireless channel intended to be changed over is below a lower limit for a required transmission capability. In the system, the wireless channel changeover part establishes the wireless channel shared by some communications between the base station and each of the plurality of the mobile stations while reserving the current wireless channel, when it is determined that the transmission capability of the intended wireless channel is below the lower limit.

In order to achieve the above object according to the present invention, a mobile communication system including a base station and a mobile station, the base station or the mobile station comprises:

an information amount measuring part, which measures an information amount, transferred between the base station and the mobile station;

a comparator part which compares the measured information amount with first and second threshold values predetermined for a current wireless channel being used by the base and mobile stations;

a wireless channel changeover part which changes the current wireless channel to a wireless channel with a higher transmission capability than the current wireless channel if the measured information amount is above the first threshold value and changes the current wireless channel to a wireless channel with a lower transmission capability than the current wireless channel if the measured information amount is below the second threshold value.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described with reference to figures.

Figure 1:
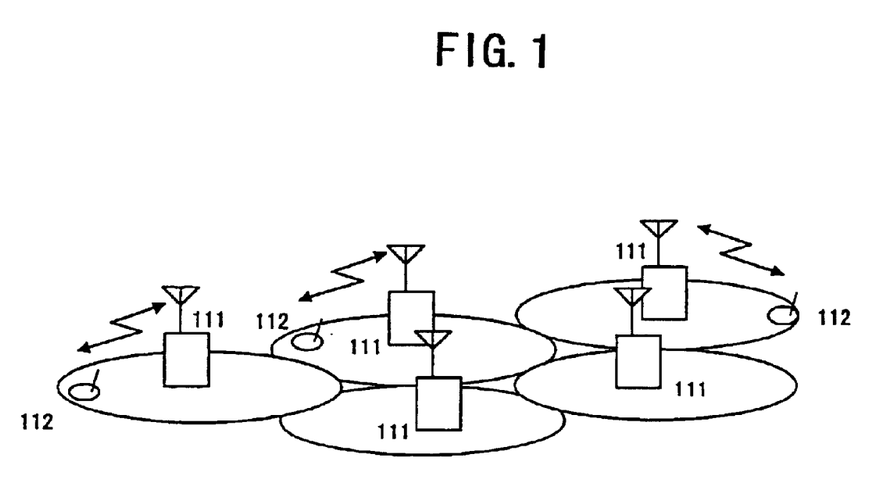
FIG. 1 shows a schematic diagram of a mobile communication system according to an embodiment of the present invention.

Referring to FIG. 1, an embodiment of a mobile communication system is illustrated where a method for changing wireless channels can be applied. The mobile communication system comprises a plurality of base stations 111, each of which covers each wireless zone or cell and mobile stations communicating with the base stations 111. Partitioning a service area makes the wireless zone. The communication between the base station 111 and the mobile station 112 is performed through wireless channels established between them. It is assumed that the communication system employs W-CDMA method and each wireless channel can be identified by spreading codes.

Figure 2:
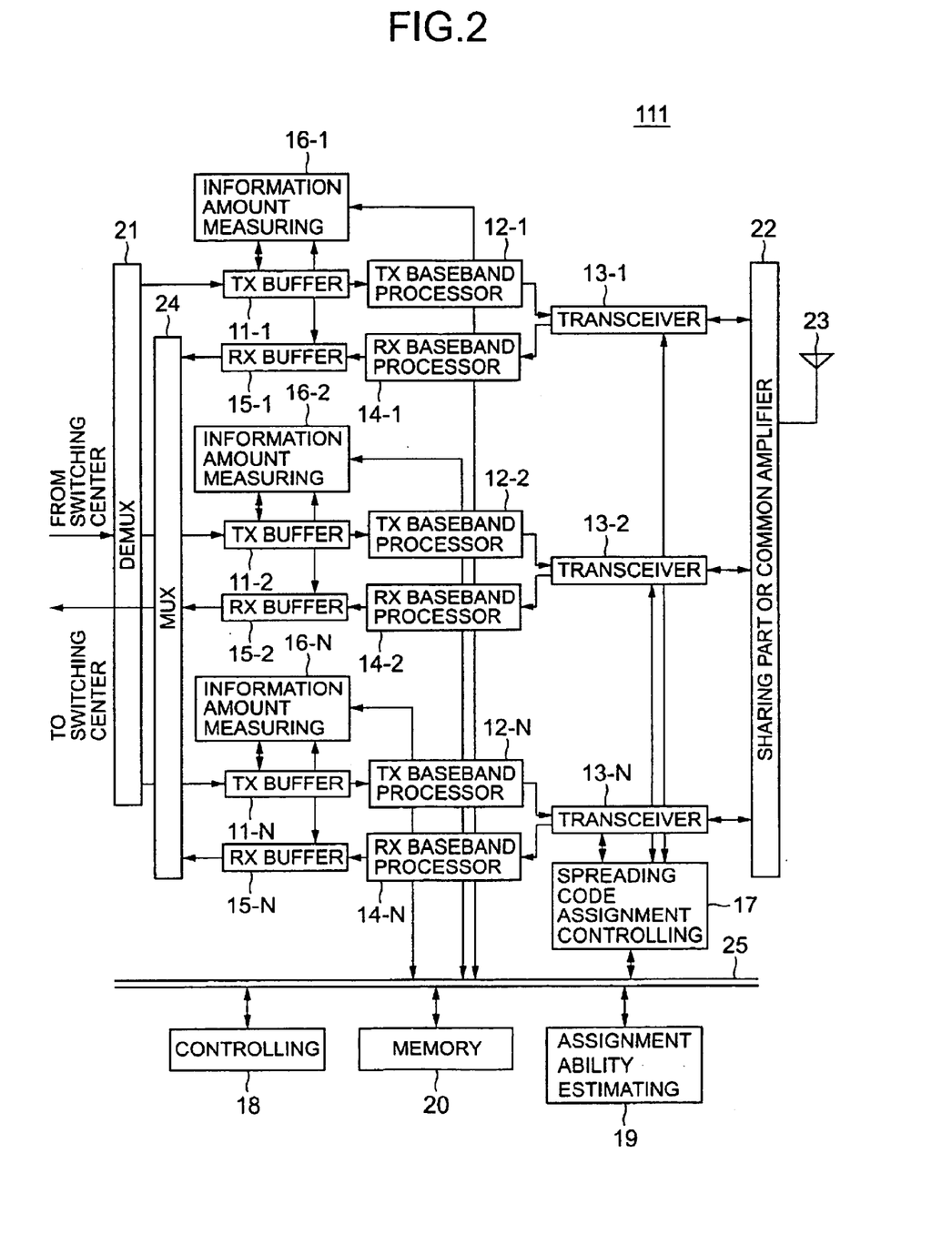
FIG. 2 shows a schematic diagram of a base station according to an embodiment of the present invention.

FIG. 2 shows a schematic diagram of the base station in the mobile communication system of FIG. 1. For the better understanding of the present invention, the base station 111 is shown to be provided solely with constituents relating to the present invention. Other constituents are abbreviated.

The base station 111 is capable of transmitting to/receiving from a maximum possible count of N mobile stations 112. The base station 111 measures the data amount transferred from/to each of the mobile stations and changes the current wireless channel to the wireless channel having higher transmission capacity if the measured amount is larger than a first threshold value and from the current wireless channel to that of lower transmission capacity.

The base station 111 includes transmitting (TX) buffers 11-1, . . . , 11-N, transmitting (TX) baseband processors 12-1, . . . , 12-N, transceivers 13-1, . . . , 13-N, receiving (RX) baseband processors 14-1, . . . , 14-N, receiving (RX) buffers 15-1, . . . , 15-N, information amount measuring parts 16-1, . . . , 16-N, a spreading code assignment controlling part 17, a controlling part 18, a assignment ability estimation part 19, a memory 20, a de-multiplexer (DEMUX) 21, a sharing part or common amplifier 22, an antenna 23 and a multiplexer (MUX) 24. The details of each element are described below.

There are the N transmitting buffers 11-1, . . . , 11-N, the N transmitting baseband processors 12-1, . . . , 12-N, the N transceivers 13-1, . . . , 13-N, the N receiving baseband processors 14-1, . . . , 14-N, the N receiving buffers 15-1, . . . , 15-N and the N information amount measuring parts 16-1, . . . , 16-N such that the base station 111 can transmit to/receive from the N largest possible mobile stations 112. The information amount measuring parts 16-1, . . . , 16-N, the spreading code assignment controlling part 17, the controlling part 18, the assignment ability estimation part 19 and the memory 20 are coupled to each other via a bus 25.

The DEMUX 21 distributes the data coming from a switching center (not shown in FIG. 1) to each of the transmitting buffers 11-1, . . . , 11-N corresponding to each destination mobile station 112, respectively. The transmitting buffers 11-1, . . . , 11-N temporally stores the data provided by the DEMUX 21 and outputs the stored data to the transmitting baseband processors 12-1, . . . , 12-N corresponding to each transmitting buffer, respectively.

The transmitting baseband processors 12-1, . . . , 12-N add information to the data from the transmitting buffers 14-1, . . . , 14-N and output the data as well as the added information to the corresponding transceivers 13-1, . . . , 13-N, respectively. The information added to the data includes, for example, an error correcting code, essential data required to keep up the wireless link and so on.

The transceivers 13-1, . . . , 13-N transmit data to the mobile station and/or receive the data from the mobile station via the wireless link. In particular, the transceivers modulate the data to be transmitted via the wireless link and demodulate wireless signals received via the wireless link. The transceivers 13-1, . . . , 13-N are coupled to the sharing part 22 for sharing the antenna 23 or the common amplifier 22 synthesizing and amplifying the wireless signals provided by each transceiver 13-1, . . . , 13-N.

The receiving baseband processors 14-1, . . . , 14-N decode the data from the corresponding transceivers 13-1, . . . , 13-N and output the decoded data to the corresponding receiving buffers 15-1, . . . , 15-N.

The receiving buffers 15-1, . . . , 15-N temporally stores the data from the corresponding receiving baseband processors 14-1, . . . , 14-N and output the stored data to the MUX 24. The MUX 24 multiplexes the data from the receiving buffers 15-1, . . . , 15-N and sends the multiplexed data to the switching center.

Each information amount measuring part 16-1, . . . , 16-N monitors contents of each of the transmitting buffers 11-1, . . . , 11-N and each of the receiving buffers 15-1, . . . , 15-N, respectively, and measures the information amount transferred between the base station 111 and the mobile station 112 for a predetermined time period, so that the information amount measuring part can determine whether it changes the current wireless channel to another wireless channel on the basis of the measured information amount.

More precisely, the information amount measuring part counts the amount of the processed data at the time when the data temporally stored in the receiving and transmitting buffers 11-1, 11-N, 15-1, . . . , 15-N are processed and takes the counted amounts of the data on the basis of the predetermined time period. Thus, the information measuring parts 16-1, . . . , 16-N can take the amount of the information being transmitted. At the same time the information amount measuring part resets the counted amount to zero.

Alternatively, the information measuring parts 16-1, ..., 16-N count the amount of the data stored in the transmitting buffers 11-1, ..., 11-N on the basis of the predetermined time period. Thus, the information measuring parts 16-1, ..., 16-N can take the amount of the information to be transmitted. At the same time the information amount measuring part resets the counted amount to zero.

The information amount measuring parts 16-1, ..., 16-N may be configured to use measurements directly or to use the measurements after being modified. For example, the information amount measuring part may calculate an average value of the predetermined number of the measurements and use the average of the measurements. Alternatively, the information amount measuring parts 16-1, ..., 16-N may pass the measurements through various filter arrangements or use the measurements multiplied by a constant.

The information amount measuring parts 16-1, ..., 16-N in the base station 111 thus measured the data amount transferred between the base station 111 and each of the mobile stations 112, and then determines whether the measured data amount is above the first threshold value or not and, if it is not the case, determines whether the measured data amount is below the second threshold value or not.

The first threshold value THR1 and the second threshold value THR2 are selected depending on the type of the wireless channel, or transmission capacity. For example, if the transmission capacity of the wireless channel is equal to 64 kbps, then the first and second threshold values amount to 50 kbps and 12 kbps, respectively. If the transmission capacity of the wireless channel is equal to 144 kbps, then the first and second threshold values amount to 110 kbps and 20 kbps, respectively. It can be found that those first and second threshold values are selected so as to accommodate within the transmission capacity.

Figure 3:
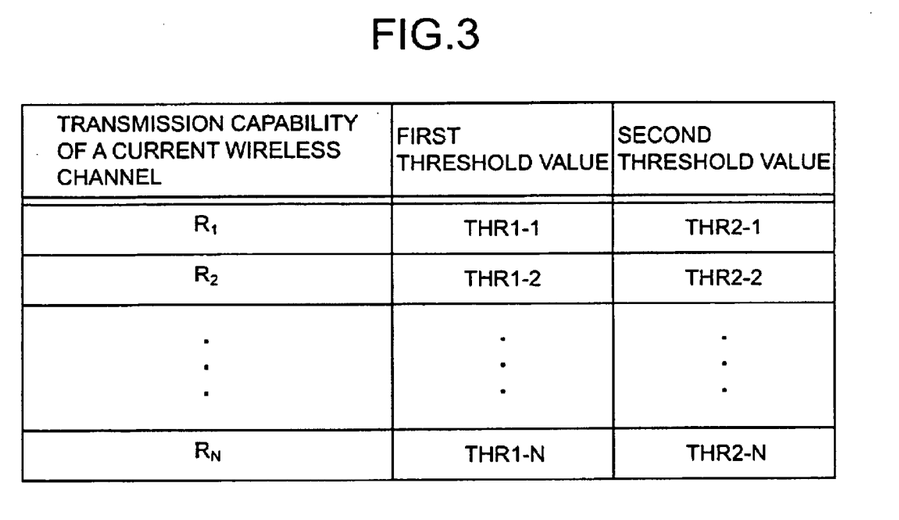
FIG. 3 illustrates first and second threshold values which have been set in accordance with a mobile channel type.

Those two threshold values THR1 and THR2 are stored in the memory 20, as shown in FIG. 3. After finding the type of the current wireless channel between the corresponding transceivers 13-1, ..., 13-N and the mobile station 112, the information amount measuring parts 16-1, ..., 16-N read the first and second threshold values corresponding to the type of the current wireless channel from the memory 20, and compare the measured data amount with the first threshold value and/or the second threshold value in order to determine whether the measured data amount is above the first threshold value and is below the second threshold value.

On one hand, if the measured data amount is above the first threshold value, then the information amount measuring part 16-1, ..., 16-N issues a changeover request indicating changing the current wireless channel to other wireless channel with higher transmission capacity. On the other hand, if the measured data amount is below the second threshold value, then the information amount measuring part 16-1, ..., 16-N issues the changeover request indicating changing the current wireless channel to other wireless channel with lower transmission capacity.

The data amount to be compared with the first and second threshold values may be derived by measuring the amount of the information yet to be transmitted. And more preferably, the data amount to be compared with the first threshold value and the second threshold value corresponds to the amount of the information yet to be transmitted and the data amount currently being transmitted, respectively, and thus a transmission rate can be rapidly raised when the transmission rate is insufficient to transmit the data.

Preferably, the information amount measuring part 16-1, ..., 16-N measures the data amount and compares the result of the measurement with the first threshold value, and records the result of the comparison if the result of the measurement is above the first threshold value. If the information amount measuring part 16-1, ..., 16-N determines that the successive results of the measurement are above the first threshold over a predetermined repetition count, then the information amount measuring part 16-1, ..., 16-N issues the changeover request indicating changing the current wireless channel to other wireless channel with higher transmission capacity. Furthermore, the information amount measuring part 16-1, ..., 16-N measures the data amount and compares the result of the measurement with the second threshold value, and records the result of the comparison if the result of the measurement is below the second threshold value. If the information amount measuring part 16-1, ..., 16-N determines that the successive results of the measurement are below the second threshold over a further predetermined repetition count, then the information amount measuring part 16-1, ..., 16-N issues the changeover request indicating changing the current wireless channel to other wireless channel with lower transmission capacity.

Accordingly, it is possible to perform the changeover of the wireless channel immediately after once the measured data amount has been above the first threshold value in order to raise the transmission rate as well as perform the changeover of the wireless channel only after the measured data amount has been successively below the second threshold value in order to lower the transmission rate. This enables to prohibit a flip-flop operation of the service and reduce the load imposed on the system.

It is noted that the above-mentioned functions such as modifying, averaging, filtering, and operations of the measured data amount as well as the functionality of successively measuring and comparing the data amount with the threshold value can be provided within the information amount measuring part 16-1, ..., 16-N.

The spreading code assignment controlling part 17 assign the spreading codes to each of the transceivers 13-1, ..., 13-N, as well as manage the assigned spreading codes and delivers a management information to the controlling part 18.

The controlling part 18 manages the overall of the base station 111. The controlling part 18 also finds free spreading codes on the basis of the management information for the spreading codes provided by the spreading code assignment controlling part 17. Next, the controlling part 18 selects a spreading code appropriate for the changeover request from the free spreading codes.

For example, after accepting the changeover request for indicating the higher transmission capability, the controlling part 18 selects the spreading code corresponding to the wireless channel having the higher transmission capacity than the current wireless channel. Whereas, after accepting the changeover request for indicating the higher transmission capability, the controlling part 18 selects the spreading code corresponding to the wireless channel having the lower transmission capacity than the current wireless channel. The result of selected spreading codes is passed to the assignment ability estimation part 19.

The assignment ability estimation part 19 receiving the result of the selected spreading codes determines whether the spreading codes corresponding to the wireless channel to be changed over can be assigned. For example, the assignment ability estimation part 19 determines whether the uplink interference power and/or the downlink transmission power reach to a limit within the system. If the limit is not reached to, then the assignment is estimated to be possible, and otherwise the assignment is estimated to be impossible.

When the assignment ability estimation part 19 estimated that the assignment is possible, then the assignment ability estimation part 19 instruct the spreading code assignment controlling part 17 to change the current spreading code to the newly assigned spreading code. On the contrary, when it is determined that the assignment is impossible, the assignment ability estimation part 19 outputs the changeover request again at the same time of measuring the data amount by the information amount measuring parts 16-1, . . . , 16-N, and estimates whether the spreading code can be assigned when the controlling part 18 selects the spreading code for the wireless channel to be changed over. Alternatively, the assignment ability estimation part 19 enters and registers an assignment request into a queue in case of the assignment being impossible, and then estimates the ability of the new wireless channel to be changed over in the order of the registration into the queue.

The spreading code assignment controlling part 17 assigns the spreading codes to the transceivers 13-1, . . . , 13-N in accordance with the instruction from the assignment ability estimation part 19, when the assignment ability estimation part 19 finds that the assignment is possible and instructs to the spread code assignment controlling part 17. This enables the changeover of the wireless channels.

In addition, where an upper and/or lower limit of the transmission capability required for the communication between the transceiver and the mobile station is provided, the spreading code assignment controlling part 17 determines whether the use of the spreading code to be assigned reaches the upper limit or the lower limit of the required transmission capability. The requirements for the upper limit and the lower limit of the transmission capability are decided on the basis of user's term of the contract for utilizing the mobile station 112, the usage of the wireless channels owned by the base station 111. If the spreading code to be assigned is above the upper limit or below the lower limit of the transmission capability, then the spreading code assignment controlling part 17 will not change the current spreading code to the spreading code to be assigned.

Figure 4:
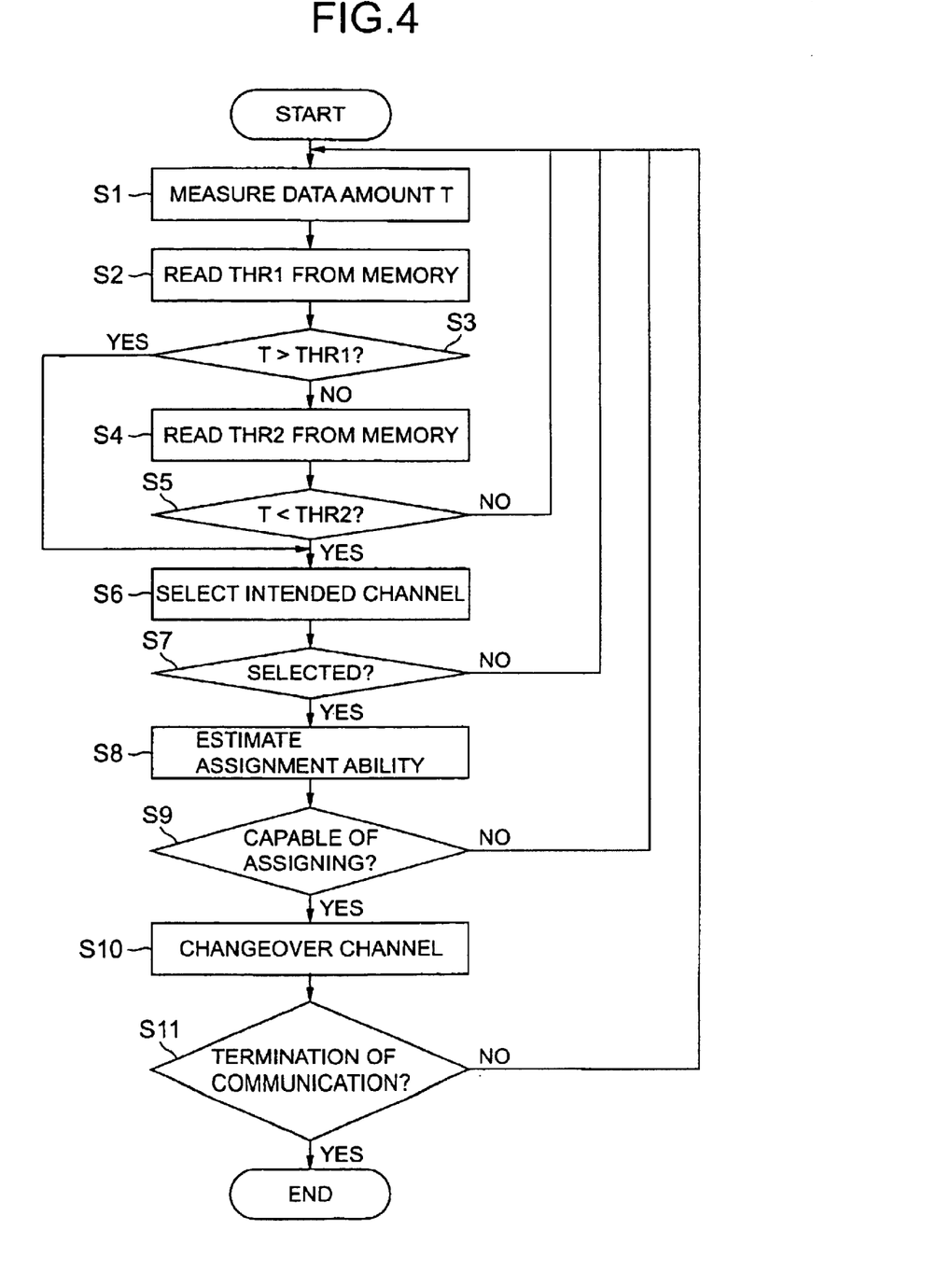
FIG. 4 shows a flow of a method for changing mobile channels according to an embodiment of the present invention.

If the lower limit of the transmission capability required for the communication between each of the transceivers 13-1, . . . , 13-N and each of the mobile stations 112 is set, the spreading code assignment controlling part 17 determines whether the use of the spreading code to be assigned causes the capability of the spreading code to be assigned to be below the required lower limit of the transmission capability. If this is the case, the spreading code assignment controlling part 17 assigns the spreading code to be assigned to the wireless channel shared by the communication between the base station 111 and the corresponding mobile station 112 while keeping the spreading code already assigned to the current wireless channel FIG. 4 illustrates an exemplary flow of a wireless channel changeover process performed by the base station 111. Here, it is assumed that both of the upper and lower limits of the transmission capability required for the communication between each of the transceivers 13-1, . . . , 13-N and each of the mobile stations 112 are not set.

The information amount measuring part 16-1, . . . , 16-N measures the data amount transferred between the base station 111 and the mobile station 112 at a predetermined time period (step 1). Next, the information amount measuring part 16-1, . . . , 16-N reads the first threshold value THR1 corresponding to the current wireless channel out of the memory 20 (step 2) and compares the measured data amount with the first threshold value and determines whether the measured data is above the first threshold value (step 3).

If this is not the case, the information amount measuring part 16-1, . . . , 16-N reads the second threshold value THR2 corresponding to the current wireless channel out of the memory 20 (step 4) and compares the measured data amount with the second threshold value and determines whether the measured data amount is below the second threshold value or not (step 5).

If this is not the case, the information amount measuring part 16-1, . . . , 16-N returns to the step 1 at the next time period of measuring the data amount.

If the measured data amount is above the first threshold at step 3 (i.e., the answer is affirmative), or if the measured data amount is below the second threshold at step 5 (i.e., the answer is affirmative), then the information amount measuring part 16-1, . . . , 16-N passes the wireless channel changeover request to the controlling part 18 and on receiving of this changeover request the controlling part 18 selects the wireless channel, that is to say the spreading code, satisfying the changeover request as a next wireless channel to be changed over (step 6). The handover request may indicate increasing or decreasing the transmission capability.

The assignment ability estimating part 19 determines whether the new wireless channel to be changed over has been selected or not on the basis of selection results from the controlling part 18 (step 7). If it is determined negatively, at the next time period of measuring the data amount the information amount measuring part 16-1, . . . , 16-N returns to the step 1.

Otherwise, if the new wireless channel to be changed over has been selected, the assignment ability estimating part 19 estimates the assignment ability of the new selected wireless channel by checking the system's capacity such as the uplink interference power and the downlink transmission power in case of W-CDMA (step 8).

Subsequently, the assignment ability estimating part 19 determines whether this new selected wireless channel can be assigned to the communication between the base station 111 and the mobile station 112 by comparing the system's capacity with its limitation (step 9).

If it is determined that the new selected wireless channel to be changed over cannot be assigned to the subject communication, then the next time period of measuring the data amount triggers the information amount measuring part 16-1, . . . , 16-N to return to the step 1.

If it is determined that the new selected wireless channel to be changed over cannot be assigned to the subject communication at step 9, then the assignment ability estimating part 19 sends the command to the spreading code assignment so as to allow the spreading code assignment controlling part 17 to change the current wireless channel to the new selected wireless channel. After receiving this command the spreading code assignment controlling part 17 assigns the spreading code to the corresponding one of the transceivers 13-1, . . . , 13-N (step 10). This enables to change the current wireless channel to the new selected wireless channel.

Finally, the controlling part 18 determines whether the communication has been terminated for each pair of the transceivers 13-1, . . . , 13-N and the mobile stations 112 (step 11). If the communication has been terminated for the pair of the transceiver and the mobile station, a sequence of the wireless channel changeover process for the pair is terminated. For the pair of the transceiver and the mobile station, which are included in a still going communication, the respective information amount measuring parts 16-1, ..., 16-N returns to the step 1 so as to repeat the steps at the next time period of measuring the data amount.

As can be seen from forgoing descriptions, according to the embodiment of the present invention, the base station 111 measures the data amount transferred from/to each of the mobile stations 112; compares the measured data amount with the first and/or the second threshold values; changes the current wireless channel to the new selected wireless channel with the higher transmission capability when the measured data amount is above the first threshold value; and changes the current wireless channel to the new selected wireless channel with the lower transmission capability when the measured data amount is below the second threshold value. Therefore, the mobile communication system can change the current wireless channel to the wireless channel suitable for the required transmission capability and can improve the transmission efficiency over the mobile communication system.

It is noted that the present invention is not limited to the above-mentioned embodiment. For example, the controlling part 18 determines the wireless channel (i.e., spreading code) to be changed over in the embodiment, whereas information specifying possible wireless channels to be changed over may be previously stored in the memory 20 and the controlling part 18 selects the wireless channel to be changed over from the possible wireless channels stored in the memory 20. Alternatively, the base station 111 and the mobile station 112 may negotiate with each other about the wireless channel to be changed over from the current wireless channel.

In the foregoing embodiment, the information amount measuring parts 16-1, ..., 16-N counts the data amount whenever the data temporally stored in the respective transmitting buffers 11-1, ..., 11-N or in the respective receiving buffers 15-1, ..., 15-N has been processed, and measures the counted number as the measurement at the predetermined time period. However, the present invention is not limited to such configuration, and in one embodiment of the present invention, other configurations can be applied, which configuration can measure the information amount transferred between the base station 111 and the mobile station 112.

In one embodiment, the information amount measuring parts 16-1, ..., 16-N take at a predetermined time period the total amount of the data temporally stored in the transmitting buffers 11-1, ..., 11-N as measurement results.

In one embodiment, the information amount transferred from the mobile station 112 to the base station 111 may be measured in the mobile station 112 or the both information amount transferred from the mobile station 112 to the base station 111 and from the base station 111 to the mobile station 111 may be measured in the mobile station 112. In the case where the information amount is measured in the mobile station 112, the mobile station 112 may be provided with a similar function that is achieved by the information amount measuring part 16 of the base station 111 and send the measurement results to the base station 111.

Figure 5:
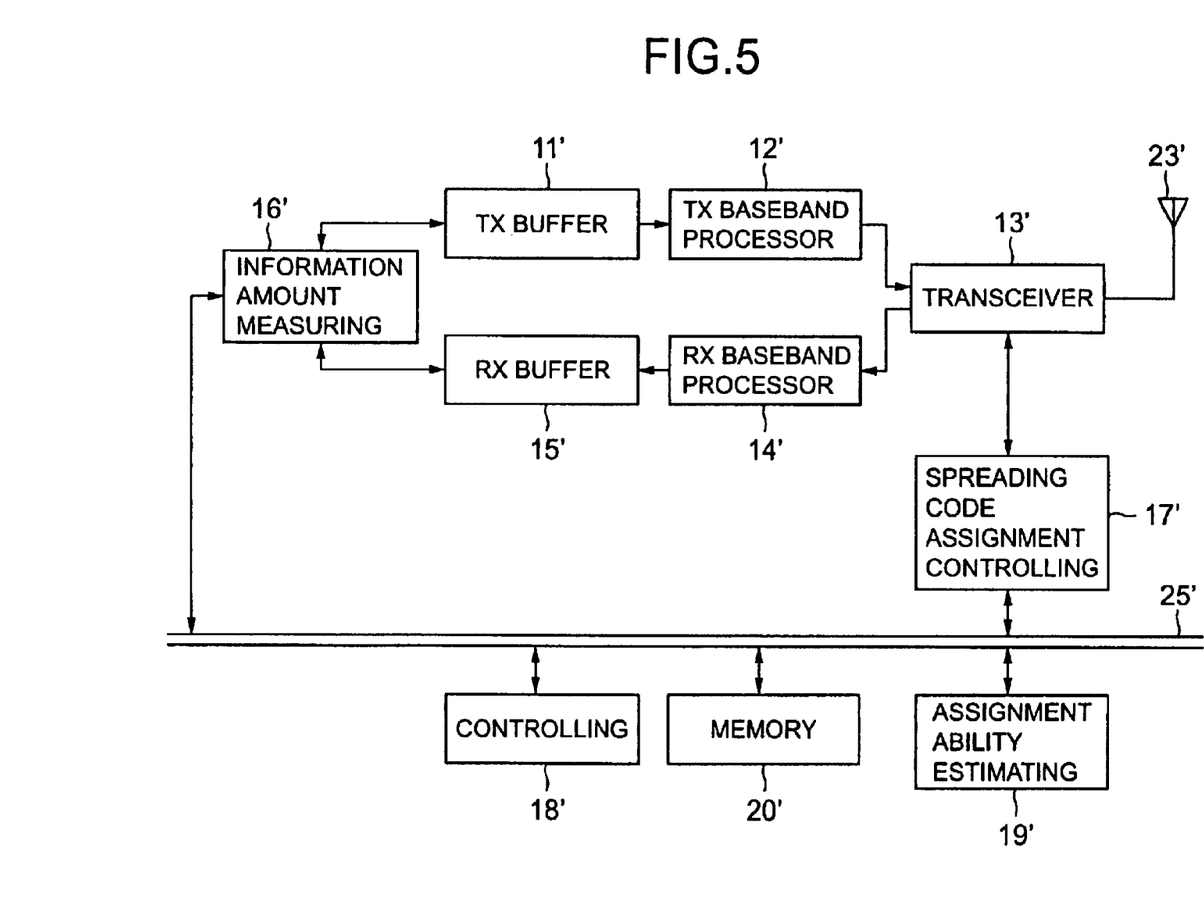
FIG. 5 shows a schematic diagram of a mobile station according to an alternative embodiment of the present invention.

FIG. 5 shows a schematic diagram of the mobile station 112 according to an alterative embodiment of the present invention, where the mobile station 112 may be arranged to perform not only measurement of the information amount, but also selection of the wireless channel (spreading code), determination of the assignment ability for the selected wireless channel, and changeover of the wireless channels.

For the better understanding of the present invention, the mobile station 112 is shown to be provided solely with constituents relating to the present invention. Other constituents are abbreviated. In this embodiment, the mobile station 112 may be provided with an information measuring part 16', a spread code assignment controlling part 17', a controlling part 18' and an assignment ability estimating part 19', which are similar or identical to the information measuring parts 16-1, ..., 16-N, the spreading code assignment part 17, the controlling part 18 and the assignment ability estimating part 19, respectively, of the base station 111 as shown in FIG. 2.

The mobile station 112 further includes a transmitting (TX) buffer 11', a transmitting (TX) baseband processor 12', a transceiver 13', a receiving (RX) baseband processor 14', a receiving (RX) buffer 15', a memory 20', an antenna 23' and a bus 25'. The details thereof have been descried above with reference to FIG. 2.

The present invention is not limited to the specifically disclosed embodiments, and variations and modifications may be made without departing from the scope of the invention.

What is claimed is:

1. A method for changing wireless channels used in a communication between a base station and a mobile station, comprising the steps of:
    a) measuring an amount of information transferred between the base station and the mobile station;
    b) comparing the measured amount of information with first and second threshold values corresponding to a transmission capability for a current wireless channel being used between the base station and the mobile station; and
    c) changing the current wireless channel to the wireless channel with a higher transmission capability than that of the current wireless channel when the measured amount of information is above the first threshold value and changing the current wireless channel to the wireless channel with a lower transmission capability than that of the current wireless channel when the measured amount of information is below the second threshold value, wherein an amount of information yet to be transmitted is measured as said amount of information to be compared with the first threshold value, and
    wherein an amount of information currently being transmitted is measured as said amount of information to be compared with the second threshold value.

2. The method for changing wireless channels as claimed in claim 1, wherein said step a) consists of measuring the amount of information yet to be transmitted.

3. The method for changing wireless channels as claimed in claim 1, wherein said step a) consists of measuring the amount of information that has been transmitted during a predetermined time period.

4. The method for changing wireless channels as claimed in claim 1, wherein
    the current wireless channel is changed to the wireless channel with the higher transmission capability than the current wireless channel only if the measured amount of information has been successively above the first threshold value over a predetermined count of times.

5. The method for changing wireless channels as claimed in claim 1, wherein
    the current wireless channel is changed to the wireless channel with the lower transmission capability than the current wireless channel only if the measured information amount has been below the second threshold value successively over a predetermined count of times.

6. The method for changing wireless channels as claimed in claim 1, wherein the current wireless channel is changed to the wireless channel with the higher transmission capability than the current wireless channel only if the measured amount of information has been successively above the first threshold value over a predetermined count of times, and the current wireless channel is changed to the wireless channel with the lower transmission capability than the current wireless channel only if the measured information amount has been successively below the second threshold value over a further predetermined count of times.

7. The method for changing wireless channels as claimed in claim 1, wherein said step c), before changing the wireless channel, includes the steps of:

determining whether the wireless channel intended to be changed over can be assigned to the communication;

when it is determined that this is not the case, determining again whether the intended wireless channel can be assigned to the communication, after a predetermined time period; and when it is determined this is the case, changing the current wireless channel to the intended wireless channel.

8. The method for changing wireless channels as claimed in claim 1, wherein said step c), before changing the wireless channel, includes the steps of:

determining whether the wireless channel intended to be changed over can be assigned to the communication;

when it is determined that this is not the case, entering an assignment request indicating changeover to the intended wireless channel into the base station and again determining whether the intended wireless channel can be assigned to the communication in order of the entered assignment request; and when it is determined that this is the case, changing the current wireless channel to the intended wireless channel.

9. The method for changing wireless channels as claimed in claim 1, wherein said step c) includes the steps of:

when at least one of an upper limit and a lower limit for a required transmission capability is set, determining whether the transmission capability of the intended wireless channel is either above the upper limit or below the lower limit; and when it is determined that the transmission capability of the intended wireless channel is above the upper limit or below the lower limit, disabling to change the current wireless channel to the intended wireless channel.

10. The method for changing wireless channels as claimed in claim 1, wherein said step c) includes the steps of:

when a lower limit of a required transmission capability is set, determining whether the transmission capability of the intended wireless channel is below the lower limit;

when it is determined that this is the case, establishing the wireless channel shared by some communications between the base station and each of the plurality of the mobile stations, while reserving the current wireless channel.

11. A mobile communication system including a plurality of base stations and a mobile station communicating with the base station through a wireless channel, comprising:

an information amount measuring part that measures an amount of information, transferred between the base station and the mobile station;

a comparator part which compares the measured amount of information with first and second threshold values predetermined for a current wireless channel being used by the base and mobile stations;

a wireless channel changeover part which changes the current wireless channel to a wireless channel with a transmission capability higher than that of the current wireless channel when the measured amount of information is above the first threshold value and changes the current wireless channel to a wireless channel with a transmission capability lower than that of the current wireless channel when the measured amount of information is below the second threshold value, wherein said information amount measuring part measures an amount of information yet to be transmitted is measured as said amount of information to be compared with the first threshold value, and wherein said information amount measuring part measures an amount of information currently being transmitted as said amount of information to be compared with the second threshold value.

12. The mobile communication system as claimed in claim 11, wherein said information amount measuring part is arranged to measure the amount of information yet to be transmitted.

13. The mobile communication system as claimed in claim 11, wherein said information amount measuring part is arranged to measure the amount of information that has been transmitted during a predetermined time period.

14. The mobile communication system as claimed in claim 11, wherein said wireless channel changeover part changes the current wireless channel to the wireless channel with the higher transmission capability than the current wireless channel only if the measured amount of information has been successively above the first threshold value over a predetermined count of times.

15. The mobile communication system as claimed in claim 11, wherein said wireless channel changeover part changes the current wireless channel to the wireless channel with the lower transmission capability than the current wireless channel only if the measured information amount has been below the second threshold value successively over a predetermined count of times.

16. The mobile communication system as claimed in claim 11, wherein said wireless channel changeover part changes the current wireless channel to the wireless channel with the higher transmission capability than the current wireless channel only if the measured amount of information has been successively above the first threshold value over a predetermined count of times, and wherein said wireless channel changeover part changes the current wireless channel to the wireless channel with the lower transmission capability than the current wireless channel only if the measured information amount has been successively below the second threshold value over a further predetermined count of times.

17. The mobile communication system as claimed in claim 11, further comprising:

an assignment ability estimating part that determines whether the wireless channel intended to be changed over can be assigned to the communication, wherein when said assignment ability estimating part determines that this is not the case, said assignment ability estimating part determines again whether the intended wireless channel can be assigned to the communication, after a predetermined time period, and wherein said wireless channel changeover part changes the current wireless channel to the intended wireless channel, when said assignment ability estimating part has determined that this is the case.

18. The mobile communication system as claimed in claim 11, further comprising:

an assignment ability estimating part which determines whether the wireless channel intended to be changed over can be assigned to the communication, and an assignment request entering part which enters an assignment request indicating changeover to the intended wireless channel, when said assignment ability estimating part determines that the intended wireless channel is not able to be assigned, wherein said assignment ability estimating part determines again whether the intended wireless channel can be assigned to the communication in order of the entered assignment request, when said assignment ability estimating part determines that the intended wireless channel is not able to be assigned, and wherein said wireless channel changeover part changes the current wireless channel to the intended wireless channel, when said assignment ability estimating part has determined that this is the case.

19. The mobile communication system as claimed in claim 11, further comprising:

a transmission capability determining part that determines whether a transmission capability of the wireless channel intended to be changed over is either above an upper limit or below a lower limit for a required transmission capability, wherein said wireless channel changeover part disables for changing the current wireless channel to the intended wireless channel, when it is determined that the transmission capability of the intended wireless channel is above the upper limit or below the lower limit.

20. The mobile communication system as claimed in claim 11, further comprising:

a transmission capability determining part that determines whether a transmission capability of the wireless channel intended to be changed over is below a lower limit for a required transmission capability, wherein said wireless channel changeover part establishes the wireless channel shared by some communications between the base station and each of the plurality of the mobile stations while reserving the current wireless channel, when it is determined that the transmission capability of the intended wireless channel is below the lower limit.

21. A base station in a mobile communication system including a plurality of base stations and a mobile station communicating with the base station through a wireless channel, comprising:

an information amount measuring part that measures an amount of information transferred between the base station and the mobile station;

a comparator part which compares the measured amount of information with first and second threshold values predetermined for a current wireless channel being used by the base and mobile stations;

a wireless channel changeover part which changes the current wireless channel to a wireless channel with a transmission capability higher than that of the current wireless channel when the measured amount of information is above the first threshold value and changes the current wireless channel to a wireless channel with a transmission capability lower than that of the current wireless channel when the measured amount of information is below the second threshold value wherein said information amount measuring part measures an amount of information yet to be transmitted is measured as said amount of information to be compared with the first threshold value, and said information amount measuring part measures an amount of information currently being transmitted as said amount of information to be compared with the second threshold value.

22. A mobile station communicating with a base station through a wireless channel in a mobile communication system including a plurality of base stations, comprising:

an information amount measuring part that measures an amount of information, transferred between the base station and the mobile station;

a comparator part which compares the measured amount of information with first and second threshold values predetermined for a current wireless channel being used by the base and mobile stations;

a wireless channel changeover part which changes the current wireless channel to a wireless channel with a transmission capability higher than that of the current wireless channel when the measured amount of information is above the first threshold value and changes the current wireless channel to a wireless channel with a transmission capability lower than that of the current wireless channel when the measured amount of information is below the second threshold value wherein said information amount measuring part measures an amount of information vet to be transmitted is measured as said amount of information to be compared with the first threshold value, and wherein said information amount measuring part measures an amount of information currently being transmitted as said amount of information to be compared with the second threshold value.

* * * * *